A. H. MIDGLEY & C. A. VANDERVELL.
SELF REGULATING DYNAMO ELECTRIC MACHINE.
APPLICATION FILED OCT. 30, 1911.
1,217,482.  Patented Feb. 27, 1917.
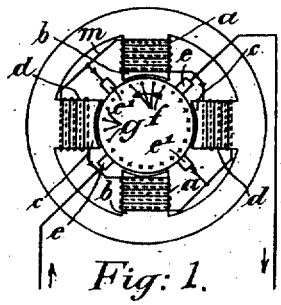
Fig: 1.
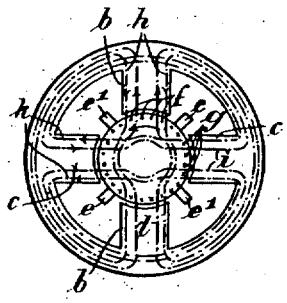
Fig: 2.
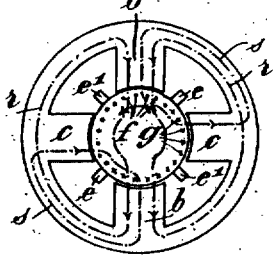
Fig: 3.
WITNESSES
John C. Sanders
John A. Percival.
INVENTORS
Albert Henry Midgley
Charles Anthony Vandervell
BY
ATTY

UNITED STATES PATENT OFFICE.

ALBERT HENRY MIDGLEY AND CHARLES ANTHONY VANDERVELL, OF ACTON VALE, ENGLAND.

SELF-REGULATING DYNAMO-ELECTRIC MACHINE.

1,217,482.  Specification of Letters Patent.  Patented Feb. 27, 1917.

Application filed October 30, 1911. Serial No. 657,635.

*To all whom it may concern:*

Be it known that we, ALBERT HENRY MIDGLEY and CHARLES ANTHONY VANDERVELL, both subjects of the King of Great Britain and Ireland, and residing at Warple Way, Acton Vale, in the county of Middlesex, England, have invented certain new and useful Improvements in and Relating to Self-Regulating Dynamo-Electric Machines, of which the following is a specification.

This invention relates to a variable speed dynamo machine of the kind which is self-regulating and supplies a current always flowing in the same direction independently of the direction of rotation of the machine. The machine is therefore especially advantageous for being used for train and car lighting purposes in conjunction with a battery or accumulators.

In the accompanying drawings

Figure 1 is a diagrammatic representation of a machine constructed according to the present invention.

Fig. 2 is a diagrammatic representation of the path of the magnetic fluxes due to each magnetizing force separately in the machine shown in Fig. 1, and Fig. 3 is a diagrammatic representation of the paths of the resultant magnetic fluxes in the machine due to the various effects produced as shown in Fig. 2.

Referring to Fig. 1, the machine has main poles $b$ each of which is provided with a winding $a$, the two ends connected to a main brush $e$, and a supplementary brush $e_1$ respectively, spanning the armature conductors under each main pole, and supplementary poles $c$, each of which is provided with a winding $d$, the ends connected to the main brush $e$ and supplementary brush $e_1$ spanning the armature conductors under each supplementary pole so that the ends of the winding on each pole are electrically connected with the ends of the windings on the two adjacent poles.

The windings $a$ and $d$ are wound in such a manner that, assuming the machine to supply a current in the direction indicated by the arrows, the currents flowing through said windings produce in the poles on which they are wound magnetic fluxes of such a direction that the upper and right-hand poles would tend to become north poles, and the lower and left-hand poles south poles, respectively.

When the machine rotates in the direction indicated by the arrow, viz: anti-clockwise, the upper and lower poles act as main north and south poles, respectively, while the right and left-hand poles act as supplementary poles, either polarity above referred to being reversed, it being determined by the armature cross-flux due to the current produced by the main poles $a$, which armature cross-flux is larger than the flux produced by the current flowing through the windings $d$. When the machine rotates in a direction opposite to that indicated by the arrow, the right and left-hand poles act as main north and south poles, respectively, while the upper and lower poles act as supplementary poles, their polarity above referred to being reversed, this being determined by the armature cross-flux due to the current produced by the poles $c$ now acting as main poles.

We have ascertained that in this machine the direction of the magnetic flux in the portions of the yoke between the upper and right-hand pole and between the lower and left-hand pole is reversed when the rotation of the machine is reversed, but that the direction of the magnetic flux in the portions between the upper and left-hand pole and between the right-hand and lower pole is always the same independently of the direction of rotation of the machine, the consequence being that the residual magnetism of the yoke is always such as to cause the upper and right-hand poles to primarily act as north poles, and the lower and left-hand poles as south poles independently of the direction of rotation of the machine when the same was last in operation.

By reference to Fig. 2 it will be seen that the flux due to the windings $a$ is represented by the chain lines $h$ and the flux due to the conductors $f$ lying under the ordinary poles $b$ is represented by the chain lines $i$. The flux due to the windings $d$ is represented by the chain lines $k$ while the flux due to the current in the armature conductors $g$ under the supplementary poles $c$ is, represented by the chain lines $l$, the direction of the flux in each case being indicated by the arrows and the flux $i$ being greater than the flux $k$. When the machine rotates in the direction shown on the drawing the flux $h$ must be of higher value than the flux $l$ in order to produce the working current of the machine.

Referring to Fig. 3 it will be seen that with the armature rotating in the direction indicated by the arrow, the resultant effect of the various magnetizing forces shown in Fig. 2 is to produce a magnetic flux $r$ which passes through the main poles $b$ and through the yoke of the machine and a small auxiliary flux $s$ which passes through the supplementary poles $c$ through the main poles $b$ and through the yoke of the machine, the direction of the fluxes being indicated by the arrows.

When the armature is rotated in the direction of the arrow, viz; anti-clockwise the operation of the machine is as follows:—

Starting with the upper and right hand poles of north polarity, the upper pole will be strengthened by reason of the fact that the current in coil $a$ assists the residual magnetism. Regarding poles $b$ as the main poles, the upper right hand brush $e$ will be positive and the lower left hand brush negative. Current will flow from the upper right hand brush $e$ through coil $d$ to lower right hand brush $e'$, thence through the armature to the upper left hand brush $e'$ through coil $d$ on the left hand pole to the lower left main brush. The residual flux from poles $c$ tends to make lower right hand brush $e'$ positive to the upper right hand brush $e$ and tends to send the current through coil $d$ to weaken this residual flux. This current does not, however, flow but an electromotive force is produced between brushes $e'$ and $e$ which weakens the poles $c$ below the strength they would have if this electromotive force were not produced. When the speed reaches the predetermined value, poles $b$ are so strong that full voltage is produced at main brushes $e$. The cross flux, due to the main line current, now reverses the residual flux from poles $c$. This cross flux produces an electromotive force which now assists the current flow in coil $d$ and this coil now tends to weaken the cross flux.

If the speed of the machine after the same has attained its normal working speed is increased the electromotive force induced in the conductors $f$ is also increased, the result being that the field of the armature conductors $f$ is increased. In consequence thereof the potential difference between the brushes $e$ and $e'$ spanning the conductors $g$ is also increased and therefore also the current flowing through the winding $d$ in the direction indicated by the arrow is increased. This current produces a field which acts in opposition to the field of the armature conductors $f$. At the same time the potential difference between the brushes $e$ and $e'$ spanning the armature conductors $g$ is increased merely because of the increase of speed apart from the increase due to the increase of the field of the armature conductors $f$. The field of the winding $d$ will therefore increase quicker than the field of the armature conductors $f$ which acts in opposition thereto so that the resulting auxiliary field $s$ (Fig. 3) is rapidly diminished when the speed is increased and the consequence being that while the demagnetizing action of the current flowing through the armature conductors $g$, and due to the cross-flux is decreased, the reduction of the auxiliary field $s$ has a preponderating effect, so that a constant voltage regulation is obtained.

On slowing down, when the main current falls to zero, the cross flux falls to zero but current still flows in coils $d$ because main poles $b$ are still strong and cause a current to flow from the main positive to the main negative brush through coils $d$ in series as at the beginning of the counter-clockwise rotation. This current causes the right hand pole to become a north pole and the left-hand pole to become a south pole, which leaves the upper and right poles of north polarity as required.

As above explained the functions of the poles of this machine are interchanged when the direction of rotation is changed, that is to say, the poles acting as main poles when the machine rotates in one direction become the supplementary poles when the machine rotates in the opposite direction, and vice versa, the function of the brushes remaining the same in both directions of rotation.

The operation of the machine when its direction of rotation indicated by the arrow is reversed is as follows:

The residual flux from poles $c$ produces an electromotive force which produces a current in windings $d$ which strengthens poles $c$, which now become the main poles. A current is produced by poles $c$ which flows from the upper main brush $e$ to the upper coil $a$ to brush $e'$ and lower coil $a$ to lower main brush $e$. This current is, however, opposed by an electromotive force produced in the armature by the residual magnetism of poles $b$, hence the poles $b$ are weak and the poles $c$ strong. The main field of the machine is thus reversed from its direction at counter-clockwise rotation and the main brushes are, therefore, of the same polarity as they were with the opposite rotation. When the current is taken from the armature the cross flux reverses the residual flux through the poles $b$ and the windings $a$ now act to oppose the cross flux to produce the desired regulation.

The operation of the machine when its speed is increased after the machine has attained its normal working speed is similar to that referred to in connection with the operation of the machine when the same rotates in the direction of the arrow, viz; anti-clockwise.

On slowing down, when the main current falls to zero, the cross flux falls to zero and a weak current, due to poles $c$, again flows from upper positive brush *e* through coils *a* to the lower negative brush *e*, leaving poles *b* with their desired polarity, that is to say the upper pole again being a north pole.

We have described our invention in relation to a two-pole machine, but we may use any number of poles; also in multi-polar machines we may use a series wound armature having less brushes than the number of poles. This is common practice for large machines.

Having now described our invention what we claim as new and desire to secure by Letters Patent is:

1. A self-regulating variable speed continuous current machine comprising in combination an armature, armature conductors, main and supplementary poles, main and supplementary brushes arranged between the main and supplementary poles and windings on the main and supplementary poles, these windings being cyclically connected together and wound on the main poles in one sense and on the auxiliary poles in the opposite sense with respect to the main brushes and the main and auxiliary brushes spanning the armature conductors under a main pole being connected to the ends of the winding on a main pole, and the main and auxiliary brushes spanning the armature conductors under a supplementary pole being connected to the ends of the winding on a supplementary pole, as set forth.

2. A reversible and self-regulating variable speed continuous current machine comprising in combination an armature, armature conductors, one set of poles, another set of poles, main and supplementary brushes arranged between the main and supplementary poles, windings on the poles belonging to the one set and on those belonging to the other set, the windings on all poles being cyclically connected together and being wound on the poles belonging to one set in one sense and on the poles belonging to the other set in the opposite sense with respect to the main brushes and the main and auxiliary brushes spanning the armature conductors under a main pole being connected to the ends of the winding on a main pole and the main and auxiliary brushes spanning the armature conductors under a supplementary pole being connected to the ends of the winding on a supplementary pole, whereby when the machine is rotated in the one direction the poles belonging to one set are excited and act as the main poles, while the other poles act as auxiliary poles, while the functions of these poles are reversed when the machine is rotated in the opposite direction, as set forth.

In testimony whereof we have signed our names to this specification in the presence of two subscribing witnesses.

ALBERT HENRY MIDGLEY.
CHARLES ANTHONY VANDERVELL.

Witnesses:
RICHARD A. HOFFMANN,
CHARLES J. R. BULLOUGH.

Copies of this patent may be obtained for five cents each, by addressing the "Commissioner of Patents, Washington, D. C."